Oct. 12, 1926.

J. REARDON

SHEARS

Filed Jan. 16, 1926

Inventor
J. Reardon

By Clarence A. O'Brien

Attorney 1,602,451

Patented Oct. 12, 1926.

1,602,451

UNITED STATES PATENT OFFICE.

JOSEPH REARDON, OF OIL CITY, PENNSYLVANIA.

SHEARS.

Application filed January 16, 1926. Serial No. 81,747.

My present invention has to do with shears or scissors; and it has for its general object the provision of shears or scissors so constructed and arranged that the blade will be yieldingly maintained in and returned to open or divergent position and hence the shears or scissors may be operated with less effort than would otherwise be the case.

Other objects and practical advantages of the invention will be fully understood from the following description and claims when the same are read in connection with the drawings, accompanying and forming part of this specification, in which:—

Similar numerals of reference designate corresponding parts in all of the views of the drawings.

Figure 1:
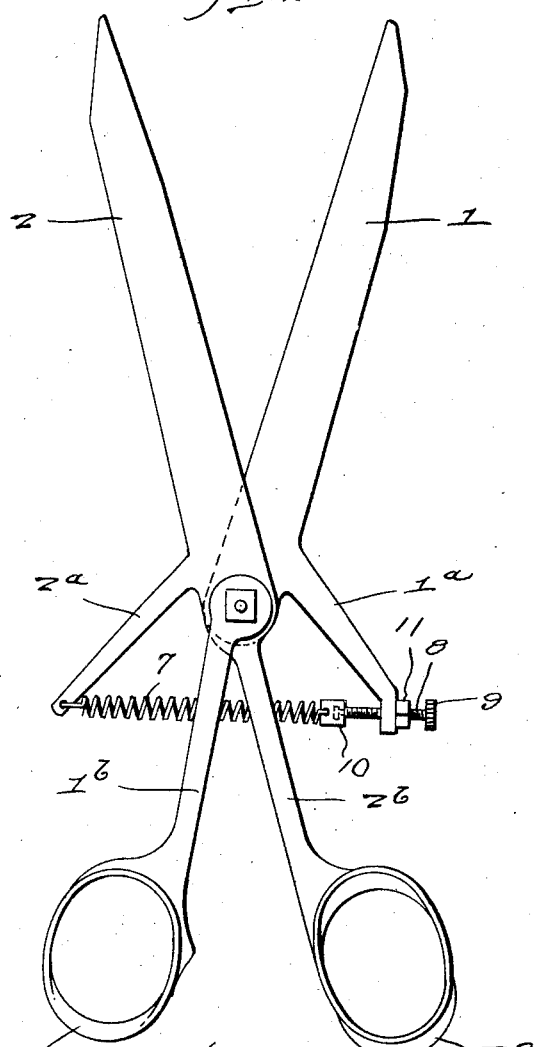
Figure 1 is a side elevation illustrating the preferred embodiment of my invention in normal position or state—i. e., with the blades open or in divergent position.
Figure 2:
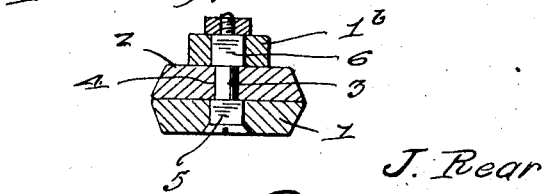
Figure 2 is an enlarged fragmentary section taken through the connection between the swingable members of the shears or scissors.

The swingable members of my novel shears or scissors are designated by 1 and 2, and by reference to the drawings it will be understood that the member 1 includes a blade, a lateral arm 1ª on the blade at one side of the center of movement, and a handle portion 1ᵇ on the blade at the opposite side of the center of movement and terminating in a single stall or open portion 1ᶜ. It will also be understood that the said swingable member 1 has the blade and the arm 1ª thereon arranged in one plane, while the handle portion 1ᵇ and its stall 1ᶜ is arranged in a parallel plane spaced from the first-named plane, and that therefore the handle portion 1ᵇ is fixedly connected to the blade and the arm 1ª integral with the blade, through the medium of a transverse connection such as shown in Figure 2; the said transverse connection being in the form of a bolt 3, journaled at 4 in the swingable member 2 and provided at 5 and 6 with portions of angular cross-sections disposed in the handle portion 1ᵇ and the blade 1, respectively, so that said handle portion 1ᵇ and blade 1 will move as one piece. The swingable member 2 in addition to its blade is provided with a lateral arm 2ª arranged at one side of the center of movement of said swingable member and a handle portion 2ᵇ arranged at the opposite side of center of movement and terminating in a stall or open portion 2ᶜ.

While I prefer to employ the transverse connection of the specific type shown in Figure 2, I desire it distinctly understood that it is within the purview of my invention to employ any other transverse connection agreeable with the described relative arrangement of the swingable members and consonant with the general purpose of my invention which is to assure the yielding maintenance of the blades 1 and 2 in divergent or open state.

Interposed between the terminal or outer portion of the arms 1ª and 2ª is a retractile spring 7, said spring being connected at one end to one of the lateral arms and preferably to the lateral arm 2ª. Threaded in the other lateral arm and preferably the lateral arm 1ª is a regulating screw 8 for the spring, the said screw 8 having a knurled head 9 to facilitate the turning of the same about its axis. The inner end of the regulating screw 8 is connected through the medium of a swivel 10 with the adjacent end of the spring 7, and hence it will be readily understood that turning of the screw 8 and endwise adjustment thereof will be attended by expansion or contraction of the spring 7, according to the direction in which the screw 8 is turned. For the purpose of preventing casual movement of the screw 8 I employ a lock nut 11 threaded on the shank of the screw 8 and adapted to be set against the arm 1ª.

In the practical use of my novel shears or scissors it will be manifest that the spring 7 by tending to contract will yieldingly maintain the blade of the members 1 and 2 in open or divergent state, and consequently to close the shears or scissors it is necessary for the user to move the stall or open finger pieces 1ᶜ and 2ᶜ toward each other. Manifestly because of this characteristic, the shears or scissors are adapted to be operated to advantage with but little effort, which is an important desideratum.

It will also be apparent from the foregoing that notwithstanding the practical advantage ascribed to my novel shears or scissors, the same are simple and compact in construction and are adapted to withstand the usage to which corresponding devices are ordinarily subjected without liability of breakage.

I have specifically described the present and preferred embodiment of my invention in all of its details in order to impart a full, clear and exact understanding of the said embodiment. I do not desire, however, to be undersrtood as confining myself to the specific construction and relative arrangement of the parts as disclosed, my invention being defined by my appended claims within the scope of which changes in structure and in arrangement may be made without departure from my invention.

Having described my invention, what I claim and desire to secure by Letters-Patent, is:—

1. Shears or scissors comprising two swingable members, one swingable member having a blade and a handle portion and also having a lateral arm at the same side of the center of movement as the blade, and extending longitudinally to a point at the opposite side of the center of movement, and the other swingable member being made up of a blade, a handle portion in a plane spaced from that of the blade and a lateral arm at the same side of the center of movement as the blade and extending longitudinally to a point at the opposite side of the center of movement and a transverse connection journaled in the first-named member and fixed to the blade and the handle portion of the second-named member, in combination with a retractile spring interposed between and connected with the outer or terminal portions of the arms of the said members.

2. Shears or scissors comprising two swingable members, one swingable member having a blade and a handle portion and also having a lateral arm at the same side of the center of movement as the blade, and the other swingable member being made up of a blade, a handle portion in a plane spaced from that of the blade and a transverse connection journaled in the first-named member and keyed or otherwise fixed to the blade and the handle portion of the second-named member, in combination with a retractile spring interposed between and connected with the outer or terminal portions of the arms of the said members; the connection of the spring to one of the lateral arms being effected through the medium of a screw mounted and adjustable in said arm, a swivel connection between the inner end of the screw and the adjacent end of the spring, and a lock nut on the screw and adapted to be put against the arm.

In testimony whereof I affix my signature.

JOSEPH REARDON.